April 30, 1929.  A. G. HENRICKS  1,710,686
STEERING GEAR
Filed Oct. 15, 1924
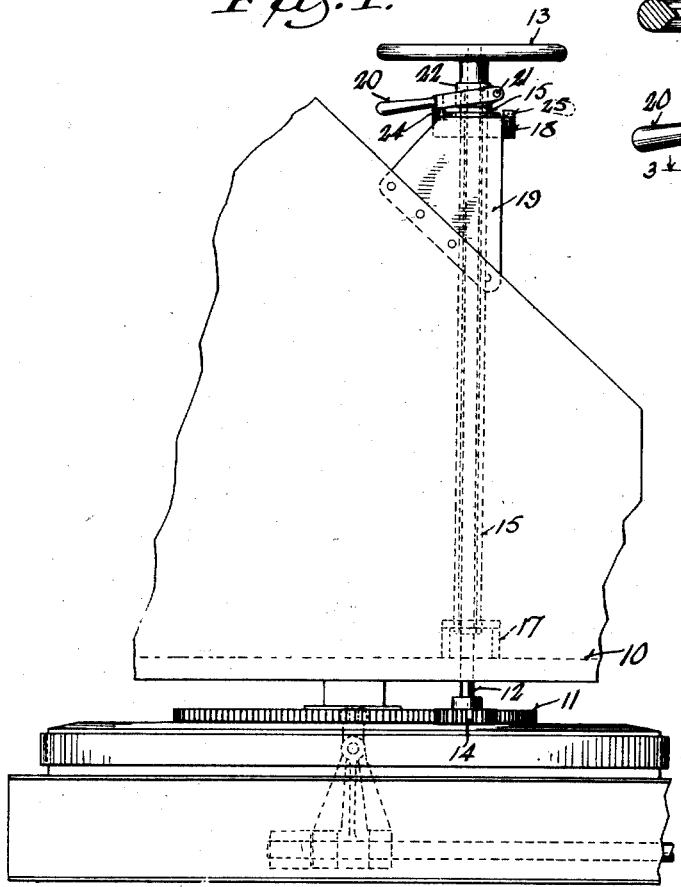
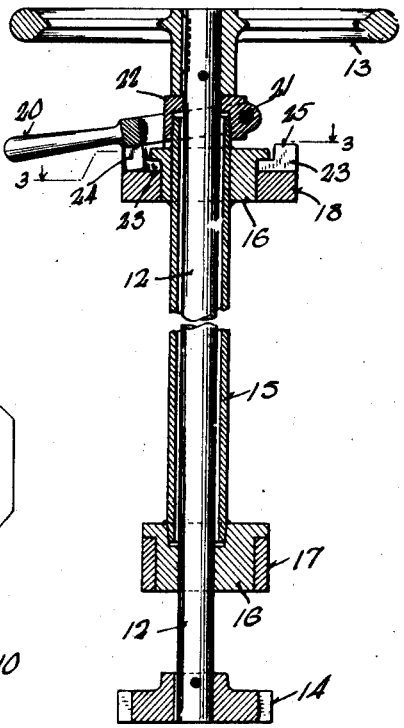
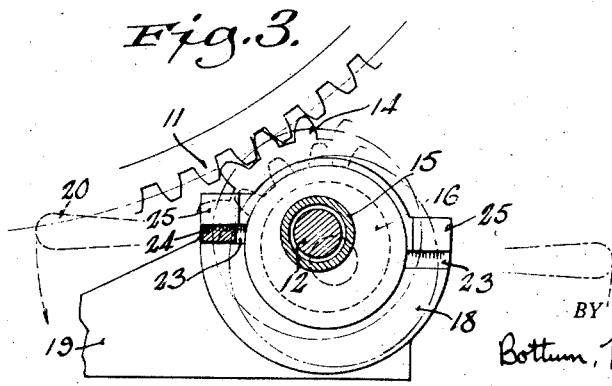
INVENTOR.
ARTHUR G. HENRICKS
BY Bottum, Hudnall, Secher and McNamara
ATTORNEYS.

Patented Apr. 30, 1929.

1,710,686

UNITED STATES PATENT OFFICE.

ARTHUR G. HENRICKS, OF WAUWATOSA, WISCONSIN, ASSIGNOR TO HARNISCH-FEGER CORPORATION, OF MILWAUKEE, WISCONSIN, A CORPORATION OF WISCONSIN.

STEERING GEAR.

Application filed October 15, 1924. Serial No. 743,706.

This invention relates to improvements in steering gear and more particularly to steering gear for motor driven vehicles employing what is commonly known as caterpillar traction.

The steering of machines of this character is usually accomplished by controlling the driving mechanism of the vehicle in such wise as to cut out the transmission of power to either one side or the other thereof.

It frequently happens in machines of this kind, as for instance in the various types of excavating machines, that the body portion of the vehicle is mounted on a turn-table or the like. The steering control on such a machine is generally in the form of an upright shaft mounted on the turn-table and provided with a pinion at its lower end adapted to mesh with an idler beneath the turn-table, which constitutes a part of the means for controlling the transmission of power. A hand lever of the usual type is provided at the upper end of the shaft for operating the same. When the body of the machine is rotated or revolved it is very desirable that the pinion carried by the steering shaft be disconnected from the idler so as to avoid the rapid rotation of the hand-wheel which would otherwise result.

One object of the present invention is to provide an improved form of steering gear disconnecting mechanism which will be within convenient reach of the operator and which may be operated by hand to connect or disconnect the pinion from the idler gear at will.

Other objects of the invention relate more particularly to certain details and features of construction tending to render the steering gear disconnecting device simple and positive in its operation, and further to incorporate in the disconnecting mechanism features of construction which will plainly indicate to the operator the position of the pinion with respect to the idler gear.

A further object is to provide steering gear disconnecting mechanism of the character described which will operate to move the pinion into meshing engagement with the idler gear in a manner which will reduce to a minimum the possibility of the teeth of said gears interfering with or preventing a proper meshing engagement.

Other objects and advantages of the invention will be apparent from a reading of the following description taken in connection with the accompanying drawings wherein one form of the invention is illustrated.

In the drawings:

Fig. 1 is an elevation of a portion of a turn-table body showing the present improvements applied thereto;

Fig. 2 is a vertical sectional view taken through the steering shaft, its bearings, etc.; and Fig. 3 is a section taken on line 3—3 of Fig. 2.

Referring more in detail to the drawings, 10 designates a turn-table body of any suitable character mounted in any desirable manner for rotation about a vertical axis. The idler gear-wheel is shown at 11 and is also mounted to turn about a vertical axis below the turn-table, and as above described this idler in practice connects with the gearing and other elements not shown through which the transmission of power is controlled in steering the vehicle.

The steering shaft is designated as 12 and is shown mounted vertically on the turn-table and provided at its upper end with hand-wheel 13. Pinion 14 is mounted on its lower end and is adapted, as above described, to mesh with idler 11 in controlling the steering of the vehicle.

According to the present invention, a tube 15 incloses shaft 12 throughout the greater portion of its length, and welded or otherwise rigidly attached to the sleeve 15 adjacent its opposite ends are collars 16. Shaft 12 extends eccentrically and rotatably through these collars 16 and the latter are in turn mounted for rotation in suitable bearing members 17 and 18. These bearing members 17 and 18 may be supported in any suitable manner upon the body or turn-table of the machine, bearing member 17 adjacent the bottom thereof, for instance, and bearing member 18 on suitable brackets 19 or the like a short distance below the hand-wheel 13. The shaft 12 extending eccentrically through collars 16, it will be apparent that upon rotation of tube 15 to which said collars are rigidly attached that the shaft together with pinion 14 at its lower end will be moved bodily in a lateral direction. In practice the parts are so arranged and proportioned that this eccentric throw of the collars 16 will be sufficient to completely disengage pinion 14 from idler 11.

In order to provide for shifting shaft 12 laterally by rotating collars 16, a hand lever 20 is pivoted as at 21 to a lug carried by collar 22 welded or otherwise securely attached to the upper end of tube 15. This lever 20 is provided with a hand grip at one end and at its other end is bifurcated to encircle the shaft and is pivotally attached to collar 22 as at 21 as above described. Bearing member 18 is provided with substantially diametrically opposite grooves 23 and lever 20 is provided with a depending lug or key 24 designed for engagement in said grooves to hold the shaft 12 in either of its adjusted positions, that is, with the pinion 14 either in or out of mesh with the idler 11, the parts being so arranged and proportioned that movement of the hand lever 20 through an arc of substantially 180 degrees will move the pinion 14 either into or out of mesh with the idler. In either of these positions the lug or key 24 of the hand lever 20 will engage in grooves 23 to prevent displacement while at the same time indicating to the operator in just what position the pinion is. To facilitate accurate manipulation of the disconnecting mechanism by means of the hand lever 20, it has been proposed to provide upstanding stops 25 immediately adjacent grooves 23 on collar 18 so that rotary movement of the lever 20 from either position to the other will be controlled through engagement of its key or lug 24 with either one or the other of these stops 25. Thus, stops 25 not only define and limit the extent of movement of lever 20 but also serve to center the key or lug 24 with respect to grooves 23. The hand wheel 13 preferably rests down upon the top of collar 22, said collar being supported in positive manner by tube 15 which in turn is rigidly attached to the collars 16. If desired, collars 16 may be flanged outwardly at their upper ends so as to overlie the adjacent upper faces of the bearing members 17 and 18, respectively, and to thus also serve in the nature of end thrust bearings.

From the foregoing it will be observed that steering gear disconnecting mechanism has been provided which is simple and positive in its operation; one which is controlled easily and quickly by the operator; and one wherein indication is afforded as to the position of the pinion. It is also desired to emphasize the operation whereby the pinion 14 is placed into and out of engagement with the idler by moving the same in an arcuate path and in its own plane bodily to such positions, for it is in this manner that interference and non-meshing of the gears are reduced to a minimum. It has heretofore been proposed in disconnecting mechanism of the character described to shift the pinion bodily up and down in a vertical direction to effect the engagement and disengagement thereof. As is well known, however, and as has developed in practice in the use of this prior connecting device, the teeth of the pinion frequently engage directly down upon the teeth of the idler when it is attempted to reengage the gears, thus preventing the proper meshing thereof. This objection is practically eliminated in the present improvements.

It will be obvious to those skilled in the art that the present improvements are susceptible of various changes and modifications without departing from the scope of the appended claims.

The invention claimed is:

1. In steering mechanism of the class described, a shaft having a pinion on one end thereof adapted to mesh with a gear wheel, a tube through which said shaft extends, collars rigidly attached to said tube, said shaft extending eccentrically through said collars, bearing members for said collars, and means associated with said shaft for rotating said tube, said latter means including a member rigidly atached to one end of said tube and loosely embracing said shaft thereabove and a hand lever carried thereby and provided with means coacting with one of said bearing members to limit the movement of said tube.

2. In steering mechanism of the class described, a shaft having a pinion on one end thereof adapted to mesh with a gear wheel, a tube through which said shaft extends, collars rigidly attached to said tube, said shaft extending eccentrically through said collars, bearing members for said collars, and means associated with said shaft for rotating said tube, said last named means including a member loosely embracing said shaft beyond one end of said tube and rigidly attached to said tube end and a pivotally mounted hand lever connected to said member and provided with a lug depending therefrom designed for engagement with grooves provided in one of said bearing members.

3. In steering mechanism of the class described, a shaft having a pinion on one end thereof adapted to mesh with a gear wheel, a tube through which said shaft extends, collars rigidly attached to said tube, said shaft extending eccentrically through said collars, bearing members for said collars, means associated with said shaft for rotating said tube, said last named means comprising a pivotally mounted hand lever and a lug depending therefrom and designed for engagement with grooves provided in one of said bearing members, and stops associated with said grooves for preventing overtravel of said lug upon movement of the hand lever and for positioning said lug for engagement with one or the other of said grooves.

4. In steering mechanism of the class described, a shaft having a pinion on one end thereof adapted to mesh with a gear wheel, a tube through which said shaft extends, collars rigidly attached to said tube, said shaft extending eccentrically through said collars, bearing members for said collars, and means for rotating said tube, one of said collars being flanged outwardly over its associated bearing member to provide an end thrust bearing for said tube.

5. In steering mechanism of the character described, a shaft having a pinion at one end thereof adapted to mesh with a gear wheel, a hand wheel at the other end of the shaft for rotating the latter, a tube surrounding said shaft intermediate its ends and for a substantial portion of its length, collars rigidly attached to said tube, said shaft extending eccentrically through said collars, bearing members for said collars, and a hand lever connected to said tube for rotating the tube and the collars to move the shaft and its pinion bodily laterally to control the engagement and disengagement of the pinion and gear wheel.

6. In steering mechanism of the class described, a shaft, a pinion on one end thereof adapted for engagement with a gear wheel, means for moving said shaft laterally to disengage said pinion from said gear wheel, said means comprising a collar eccentrically and loosely surrounding said shaft, a fixed bearing for said collar, a member interposed between said shaft and said collar and fixed to the latter, and means for actuating said member to move said collar in said bearing.

7. In steering mechanism of the class described, a shaft having a pinion on one end thereof adapted to mesh with a gear wheel, a hand wheel at the other end of said shaft for rotating the latter, a tube through which said shaft extends, a collar rigidly and eccentrically attached to said tube, a bearing member for said collar, and manually operable means associated with said tube in close proximity to said hand wheel for rotating the tube to thereby move the shaft bodily laterally to disengage the pinion and gear wheel.

8. In steering mechanism of the class described, a shaft having a pinion on one end thereof adapted to mesh with a gear wheel, a tube through which said shaft extends, said tube throughout its length having an internal diameter greater than the external diameter of said shaft, collars rigidly and eccentrically attached to said tube on the exterior thereof, bearing members for said collars, and means for rotating said tube.

In witness whereof I hereto affix my signature.

ARTHUR G. HENRICKS.